May 20, 1924.

L. M. ASPINWALL 1,494,402

MOTOR CONTROL SYSTEM AND APPARATUS

Filed Nov. 29, 1921    2 Sheets-Sheet 1

WITNESSES:
R. S. Harrison
H. C. Lowe

INVENTOR
Louis M. Aspinwall,
BY
Wesley G. Carr
ATTORNEY

May 20, 1924.
L. M. ASPINWALL
1,494,402
MOTOR CONTROL SYSTEM AND APPARATUS
Filed Nov. 29, 1921  2 Sheets-Sheet 2
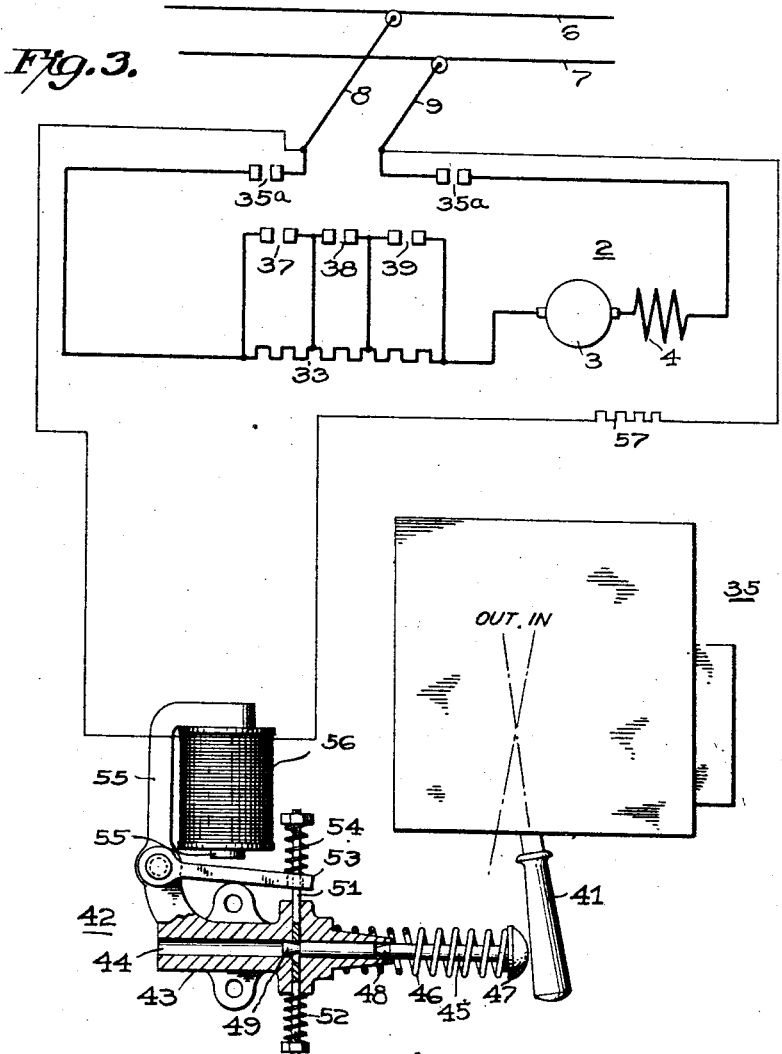
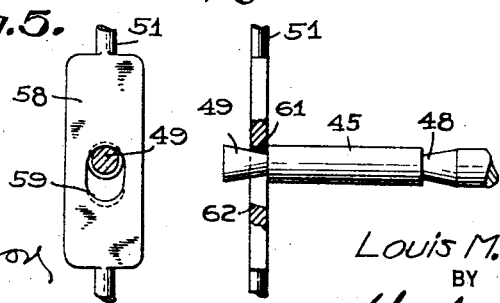
WITNESSES:
R. S. Harrison
H. C. Lowe
INVENTOR
Louis M. Aspinwall
BY
Wesley G. Carr
ATTORNEY Patented May 20, 1924.

1,494,402

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM AND APPARATUS.

Application filed November 29, 1921. Serial No. 518,574.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Motor-Control Systems and Apparatus, of which the following is a specification.

My invention relates to motor-control systems and it has particular relation to control systems for governing the operation of motors that are employed to drive a trackless trolley vehicle.

One object of my invention is to provide automatic means for preventing a difference of potential existing between the vehicle body and ground when one of a plurality of current-collecting devices becomes disengaged from the corresponding supply conductor.

Another object of my invention is to provide means for necessitating the return of a controller to its inoperative position before re-energizing the control system after one of the current-collecting devices has assumed an inoperative position.

Still another object of my invention is to provide a motor-control system that shall be simple and economical in construction and positive and reliable in operation.

Heretofore, when one of a plurality of current-collecting devices, such, for example, as trolley poles of a trackless vehicle, became disengaged from the corresponding trolley conductor, while another trolley pole remained in engagement with the other trolley conductor, there was a possibility of establishing a difference of electrical potential between the metallic vehicle frame or body and ground. This possibility is a source of danger to passengers, particularly upon rainy days, when getting in and out of the vehicle.

Briefly speaking, my invention consists in providing an electrical device having its actuating coil connected directly to the current-collecting devices for effecting the opening of one or more circuit-breakers upon one of the current-collecting devices occupying an inoperative position.

For a better understanding of my invention, reference may be made to the accompanying drawings, Figure 1 of which is a diagrammatic view of a portion of a motor-control system;

Fig. 3 is a diagrammatic view of a motor-control system and apparatus designed to govern it;

Fig. 4 is a view, partly in side elevation and partly in section, of a portion of apparatus that is illustrated in Fig. 3 of the drawings; and Fig. 5 is a view, in end elevation, of apparatus that is illustrated in Fig. 4 of the drawings.

Figure 1:
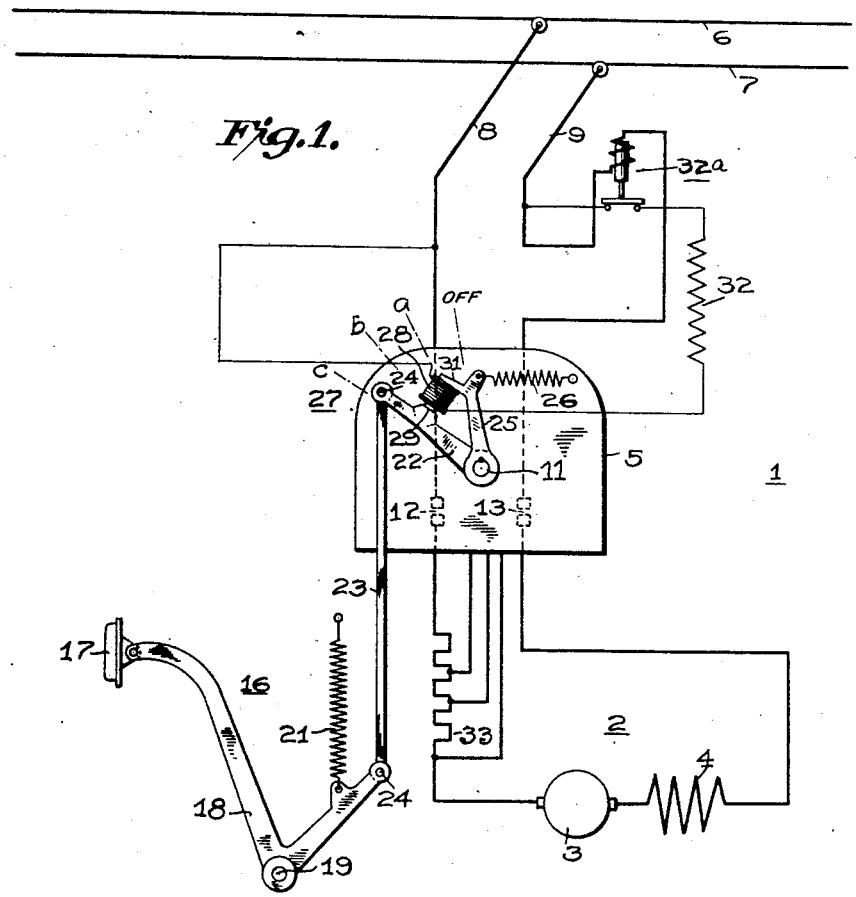

Referring particularly to Fig. 1 of the drawings, a trackless-trolley vehicle 1, only parts of which are illustrated, is provided with a motor 2, having an armature 3 and a series field magnet winding 4 The operation of the motor 2 is governed by a controller 5, having an "off" position and a plurality of operative positions, *a*, *b* and *c*

The motor 2 is energized from a source of electrical energy, such, for example, as the trolley conductors 6 and 7, by means of a plurality of current-collecting devices 8 and 9. The current-collecting devices 8 and 9 may be of any design, but, for the sake of convenience, they are illustrated as trolley poles.

Figure 2:
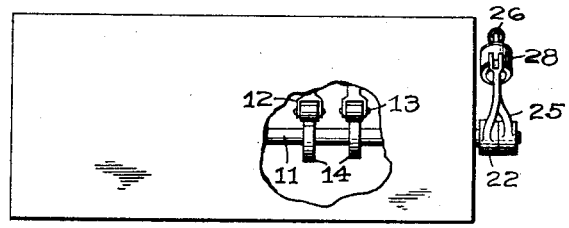
Fig. 2 is a view, in side elevation, of a controller that is illustrated in Fig. 1 of the drawings.

The controller 5 is provided with a cam shaft 11, which is best illustrated in Fig. 2 of the drawings, and with a plurality of switches 12 and 13, the operation of which is governed by means of cam members 14, which are securely mounted upon the shaft 11. The cam shaft 11 may be actuated by means of a body-actuated device 16. The body-actuated device 16 preferably comprises a pedal 17, which is pivotally mounted upon a bell-crank arm 18. The bell-crank arm 18, which is pivotally mounted upon the bolt 19, is biased to its inoperative position—which is the position illustrated in the drawing—by means of a resilient member or spring 21. The crank arm 18 is mechanically connected to an arm 22, which is rotatably mounted upon the cam shaft 11 by means of a tie rod 23 and pins 24.

The controller 5 is provided with a lever arm 25, which is securely mounted upon the cam shaft 11. The lever arm 25 is biased to the position illustrated in the drawings by means of a resilient member or spring 26. An electromagnetic power-transmission device 27 comprises an actuating coil 28, which is mounted upon a core member 29, constituting a portion of the rotatably mounted arm 22. The lever arm 25 is provided with a relatively broad flat end portion 31, which co-operates with the core member 29 and lever arm 22 to form a magnetic circuit, which is energized by the coil 28. The terminals of the coil 28 are connected to the current-collecting devices 8 and 9, respectively, a suitable resistor 32 being preferably connected in circuit with the coil.

The operation of the control system that is illustrated in Figs. 1 and 2 of the drawings is begun by actuating the pedal 17 in a clockwise direction, thereby causing the lever arm 22 to turn in a counter-clockwise direction. Assuming that the trolley conductors 6 and 7 are energized and the current-collecting devices 8 and 9 occupy their operative positions, the coil 28 is energized by a circuit from the positive trolley conductor 6 through current-collecting device 8, magnetizing coil 28, control resistor 32, contact members of overload trip 32$^a$ and current-collecting device 9 to the negative trolley conductor 7. When the coil 28 is energized, the arm 25 will be actuated upon movement of the arm 22 to position $a$, thereby effecting counter-clockwise rotation of the cam shaft 11. Upon the closure of the normally open line switches 12 and 13 (see Fig. 2), which is effected by the turning movement of the cam members 14, a circuit is established from the positively-energized trolley conductor 6, through current-collecting device 8, line switch 12, starting resistor 33, armature 3 and series field-magnet winding 4 of the motor 2, line switch 13, actuating coil of overload relay 32$a$ and current-collecting device 9 to the negatively-energized trolley conductor 7.

Upon further movement of the pedal 17, the controller 5 will be actuated from position $a$ to position $b$ to effect the closure of a plurality of accelerating switches, which have not been illustrated. The closure of the accelerating switches will shunt the starting resistor 33, in accordance with familiar practice, thereby increasing the speed of the motor 2.

If either of the current-collecting devices 8 and 9 should occupy an inoperative position, or if the overload relay 32$a$ should assume its open position, the coil 28 would be deenergized and the resilient member 26 would return the controller 5 to its "off" position, by reason of the rupture of the magnetic lock between the arms 22 and 25.

It is, of course, apparent that, in actual practice, more than one motor would probably be employed, thus requiring more elaborate controllers than that which has been illustrated. However, this change would, in no wise, affect the construction of apparatus employed to practice my invention, other than to increase the size of some of the parts.

Referring particularly to Fig. 3 of the drawings, the motor 2 is provided with armature 3 and series field-magnet winding 4. Upon the closure of a plurality of contact members 35$a$, which constitute portions of a line switch 35, the motor 2 is energized by current from the trolley conductors 6 and 7 through the current-collecting devices 8 and 9, in a manner similar to that described in connection with the operation of the control system illustrated in Fig. 1 of the drawings. A plurality of accelerating switches 37 to 39, inclusive, are provided for shunting the starting resistor 33, thereby accelerating the motor 2, as previously set forth.

The line switch 35 is provided with a handle 41, which is illustrated as occupying the "out" position, which corresponds to the open position of its contact members 35$a$. Athough movement of the handle 41 to its "in" position is effected manually, its movement is also governed by electromagnetic device 42, which comprises a securely mounted body member 43 having a passage 44 extending throughout its length.

An actuating member or pin 45 is slidably mounted within the passage 44 and is biased to the position illustrated in the drawing by means of the resilient member or coil spring 46. The actuating member 45 is provided with a head 47, which may engage the handle 41 of the line switch 35, and with a plurality of grooves or notches 48 and 49, (see Fig. 4) which are adapted to engage a movably mounted latching member 51 that extends through the body member 43. The latching member 51 is biased to its lower position, by means of a resilient member 52, which is the position that is illustrated in Figs. 3 to 5, inclusive. The latching member 51 may be actuated upwardly by means of an armature member 53, that engages a resilient member 54, which surrounds the upper end of the latching member 51.

The armature member 53 constitutes a portion of a magnetic circuit comprising a core member 55. A magnetizing coil 56, which surrounds a portion of the core member 55, has its terminals connected to the current-collecting devices 8 and 9. An auxiliary control resistor 57 is connected in series relation with the actuating coil 56 to reduce the voltage applied thereto.

Referring particularly to Figs. 4 and 5 of the drawings, the latching member 51 is provided with a relatively flat portion 58, having a hole 59 therein. The hole 59 has two of its sides cut in diagonal relation to the broad sides of the latching member 58, thereby providing a plurality of projecting portions or shoulders 61 and 62, which are adapted to engage the notches 48 and 49 of the actuating member 45.

When the latching member 51 occupies the position illustrated in Figs. 3 to 5, inclusive, of the drawings, movement of the actuating member 45 away from the handle 41 is prevented, and the handle of the switch 35 is thus locked to the "out" position.

When the coil 56 is energized, the armature member 53 is drawn upwardly, thereby subjecting the resilient member 54 to compression, and thus lifting the latching member 51. The handle 41 can then be moved to the closed position, thus actuating the member 45 within the cavity 44 of the body member 43, until the projection 62 of the latching member 51 engages the grooved portion 48 of the actuating member 45.

The resilient member 46 will be unable to actuate the rod 45 so long as the projection 62 of the latching member 51 is situated within the groove 48. When the coil 56 is deenergized, which will occur upon one of the current-collecting devices 8 or 9 assuming an inoperative position, the resilient member 52 will become operative to actuate the latching member 51 downwardly, thereby freeing the groove 48 of the actuating member 45 from the projection 62 of the latching member 51 and thus permitting the resilient member 46 to actuate the actuating member 45 outwardly and trip the handle 41 of the line switch 35.

An operator will be unable to actuate the handle 41 of the line switch 35 toward its closed position until after the coil 56 is re-energized. The shape of the projection 61 of the latching member 51 permits it to slide out of the groove 48 of the actuating member 45, and, likewise, the projection 62 of the locking member 51 is such that it will slide out of the groove 49 of the actuating member 45.

From the above description, it is apparent that I have provided means for opening the line switches of a trackless-trolley vehicle when one or both of the current-collecting devices disengage the corresponding trolley conductor or conductors, and the system cannot be re-energized until after the trolley poles occupy their operative positions and the operator performs some positive operation to effect movement of the controller or line switch.

While I have shown the apparatus and electrical connections therefor in the preferred form, it is apparent that numerous modifications of both may be made without departing from the spirit thereof. I desire, therefore, to be limited only by the scope of the appended claims.

I claim as my invention:—

1. In a control system, the combination with a dynamo-electric machine, of a plurality of current-collecting devices, means for connecting said machine in circuit with said devices, and means comprising a coil for rendering said means inoperative upon one of said devices assuming an inoperative position, said coil being connected to said devices independently of said connecting means.

2. In a control system, the combination with a dynamo-electric machine, of a plurality of current-collecting device, a plurality of switches for connecting said machine to said devices, and means comprising a coil for closing said switches, said coil being connected to said devices between said switches and said devices.

3. In a control system, the combination with a dynamo-electric machine, of a plurality of current-collecting devices, means comprising a controller for connecting said machine to said devices, said controller having an operative and an inoperative position, and means for returning said controller to its inoperative position upon one of said devices occupying an inoperative position.

4. In a control system, the combination with a dynamo-electric machine, of a plurality of current-collecting devices, means comprising a controller for connecting said machine to said devices, said controller having an operative and an inoperative position, and means comprising an electromagnet for returning said controller to its inoperative position upon one of said devices occupying an inoperative position.

5. In a control system, the combination with a dynamo-electric machine, of a plurality of current-collecting devices, means comprising a controller for connecting said machine to said devices, said controller having an operative and an inoperative position, means comprising a body-actuated device and an electromagnetic device for actuating said controller from its inoperative position and means comprising said electromagnetic device for returning said controller to its inoperative position upon one of said current-collecting devices occupying an inoperative position.

6. In a control system, the combination with a dynamo-electric machine, of a plurality of current-collecting devices, means comprising a controller having a shaft for connecting said devices to said machines, means for biasing said shaft to an inoperative position, a pedal device for actuating said shaft and an electromagnetic device for transmitting the actuating force from said pedal device to said shaft, said electromagnetic device having a coil that is connected to said collecting devices between said connecting means and said collecting devices.

7. In a control system, the combination with a dynamo-electric machine, of a plurality of current-collecting devices, a line switch for connecting said machine to said devices, and a device for opening said line switch upon one of said current-collecting devices occupying an inoperative position.

8. In a control system, the combination with a dynamo-electric machine, of a plurality of current-collecting devices, a line switch for connecting said machine to said devices, and an electromagnetic device for opening said line switch upon one of said current-collecting devices occupying an inoperative position.

9. In a control system, the combination with a dynamo-electric machine, of a plurality of current-collecting devices, means comprising a controller for connecting said machine to said devices, means comprising a coil for actuating said controller, and means for de-energizing said coil upon said machine being subject to an excessive current.

10. In a control system, the combination with a dynamo-electric machine, of a plurality of current-collecting devices, means comprising a controller for connecting said machine to said devices, said controller having an "off" position and an operative position, means for biasing said controller to its "off" position, means for actuating said controller to its operative position and means for rendering said actuating means inoperative upon said machine being subjected to an excessive current.

11. In a control system, the combination with a dynamo-electric machine, of a plurality of current-collecting devices, a line switch for connecting said machine to said devices, means for opening said switch upon one of said devices occupying an inoperative position, and a latching device for preventing the closure of said switch until said current-collecting device reoccupies its correct position.

12. In a control system, the combination with a dynamo-electric machine, of a plurality of current-collecting devices, a line switch for connecting said machine to said devices, a rod, a holding member for slidably mounting said rod, a resilient member for actuating said rod to open said line switch, and means comprising a coil for locking said rod member in a plurality of positions, said coil being connected to said collecting devices between said switch and said devices.

13. In a control system, the combination with a dynamo-electric machine, of a plurality of current-collecting devices, a line switch for connecting said machine to said devices, said switch having a movable element for opening said switch and electromechanical means for actuating said element upon one of said devices occupying an inoperative position.

14. In a control system, the combination with a dynamo-electric machine, of a plurality of current-collecting devices, a line switch for connecting said machine to said devices, said switch having a handle, and electromechanical means for actuating said handle.

In testimony whereof, I have hereunto subscribed my name this 14th day of November, 1921.

LOUIS M. ASPINWALL.